United States Patent
Bunker et al.

(10) Patent No.: US 6,261,054 B1
(45) Date of Patent: Jul. 17, 2001

(54) COOLABLE AIRFOIL ASSEMBLY

(75) Inventors: Ronald Scott Bunker, Niskayuna, NY (US); James William Bartos, Wilmington, OH (US); Nicholas Damlis, Cincinnati, OH (US); Mark Eugene Noe, Hamilton, OH (US); Steven Douglas Ward, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/235,914

(22) Filed: Jan. 25, 1999

(51) Int. Cl.[7] .................................................. F01D 5/18
(52) U.S. Cl. ................................... 415/115; 416/96 R
(58) Field of Search ................................ 415/115, 116; 416/96 R, 96 A, 97 R, 233, 1

(56) References Cited

U.S. PATENT DOCUMENTS

| | | | |
|---|---|---|---|
| 4,359,310 | * 11/1982 | Endera et al. | 415/115 |
| 4,529,357 | * 7/1985 | Holland | 416/96 R |
| 5,328,331 | 7/1994 | Bunker et al. | 415/115 |
| 5,484,258 | 1/1996 | Isburgh et al. | 415/115 |
| 5,533,864 | * 7/1996 | Nomoto et al. | 415/115 |
| 5,611,197 | 3/1997 | Bunker | 415/115 |
| 5,634,766 | * 6/1997 | Cunha et al. | 415/115 |

OTHER PUBLICATIONS

"Power Systems for the 21st Century "H" Gas Turbine Combined Cycles," James C. Corman; Thomas C. Paul, GER-3935, Jun. 1995, pp.1–12.

* cited by examiner

Primary Examiner—Edward K. Look
Assistant Examiner—Richard Woo
(74) Attorney, Agent, or Firm—Patrick K. Patnode; Marvin Snyder

(57) ABSTRACT

An apparatus and method including a closed-circuit coolable airfoil assembly for use and exposure in a hot fluid flow of a machine portion. The assembly includes a first flange configured to be connected with a casing of the machine portion. A second flange is configured to be connected with the casing. An airfoil is connected with and between the first flange and the second flange, the airfoil including a peripheral portion surrounding a medial portion. At least one channel is disposed in the peripheral portion, the channel extending between the first flange and the second flange and being in flow communication with each. A closed flow path is formed from the casing and through the first flange, the second flange and the channel in which a coolant fluid can pass to cool the airfoil assembly.

19 Claims, 8 Drawing Sheets

COOLABLE AIRFOIL ASSEMBLY

BACKGROUND OF THE INVENTION

This invention relates, generally, to airfoils and, more particularly to a closed-circuit coolable airfoil assembly of a machine.

Airfoils may be employed in various machines, for example, power turbines, compressors or aircraft engines. Vanes and blades are examples of airfoils. A blade, which blade may also be referred to as a "bucket" or "rotor," may comprise an airfoil mounted to a wheel, disk or rotor, for rotation about a shaft. In addition, a vane, which vane may be referred to as a "nozzle" or "stator," may comprise an airfoil mounted in a casing surrounding or covering the shaft about which the blade rotates. Typically, a series of blades are mounted about the wheel at a particular location along the shaft. Furthermore, a series of vanes are typically mounted upstream (relative to a general flow direction) of the series of blades, such as for maximizing efficiency of a fluid, for example, a gas flow. Such an arrangement of vanes succeeded by blades may be referred to as a "stage."

A number of stages of vanes and blades may be located in a compressor in order to compress gas, for example, to be mixed and ignited with fuel, to be delivered to an inlet of a turbine. The turbine may include a number of stages of vanes and blades in order to extract work from the ignited gas and fuel. The fuel may comprise, for example, natural gas or oil. Further, the addition of the fuel to the compressed gas may involve a contribution of energy to the combustive reaction, which may raise the temperature of the gas to, for example, 3000 to 3500 degrees Fahrenheit. The product of this combustive reaction then flows through the turbine.

In order to withstand high temperatures produced by combustion, the airfoils in the turbine need to be cooled. Insufficient cooling results in undue stress on the airfoil and over time this stress leads or contributes to fatigue and failure of the airfoil. For example, existing cooling configurations include air-cooling, open-circuit cooling, closed-circuit cooling and film-cooling, using a cooling fluid from the compressor, engine or an external source. These configurations, however, do not always enable effective cooling of the airfoil to increase engine efficiency.

Accordingly, a need exists in the art for better or improved cooling of the airfoil to increase engine efficiency.

BRIEF SUMMARY OF THE INVENTION

A closed-circuit coolable airfoil assembly for use and exposure in a hot fluid flow of a machine portion. The assembly includes a first flange configured to be connected with a casing of the machine portion. A second flange is configured to be connected with the casing. An airfoil is connected with and between the first flange and the second flange, the airfoil including a peripheral portion surrounding a medial portion. At least one channel is disposed in the peripheral portion, the channel extending between the first flange and the second flange and being in flow communication with each. A closed flow path is formed from the casing and through the first flange, the second flange and the channel in which a coolant fluid can pass to cool the airfoil assembly.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
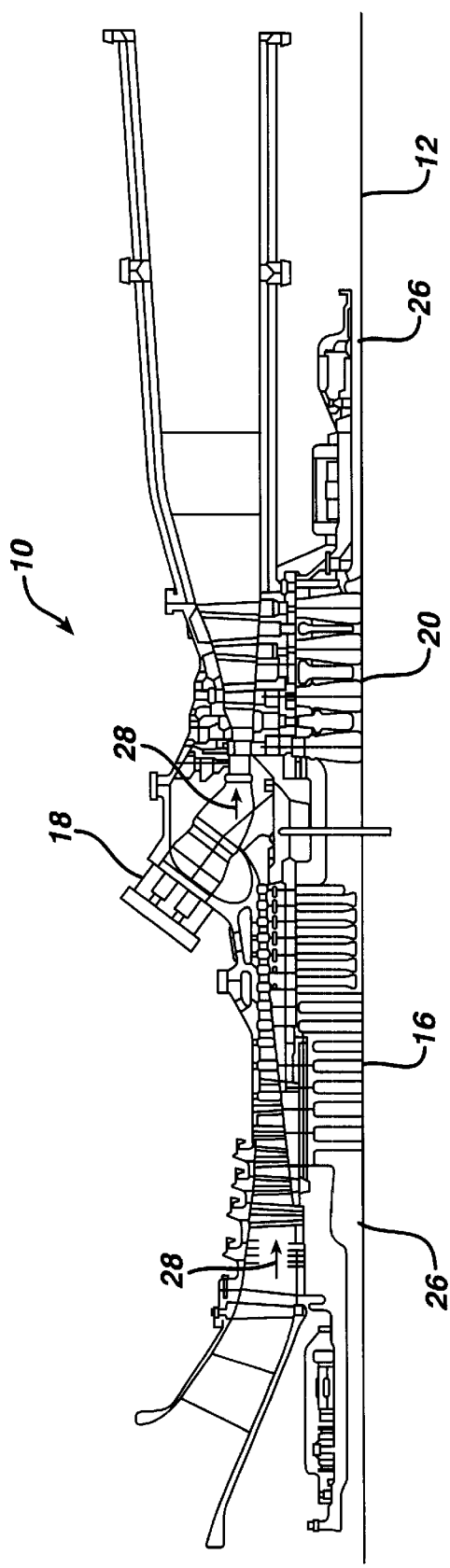
FIG. 1 is a cross-sectional view of a power gas turbine engine having air cooled turbine vane airfoil assemblies with peripheral cooling channels in accordance with one embodiment of the present invention.

Illustrated in FIG. 1 is a machine 10, for example, a power gas turbine engine circumferentially disposed about an engine centerline 12. Machine 10 includes, in serial flow relationship, compressor 16, a combustion section 18 and a turbine 20. Combustion section 18 and turbine 20 are often referred to as the hot section of turbine engine 10. A rotor shaft 26 drivingly connects turbine 20 to compressor 16. Fuel is burned in combustion section 18 producing a very hot fluid flow 28, for example, in the range between about 3000 to about 3500 degrees Fahrenheit, which hot gas flow 28 is directed through turbine 20 to power machine 10.

Figure 2:
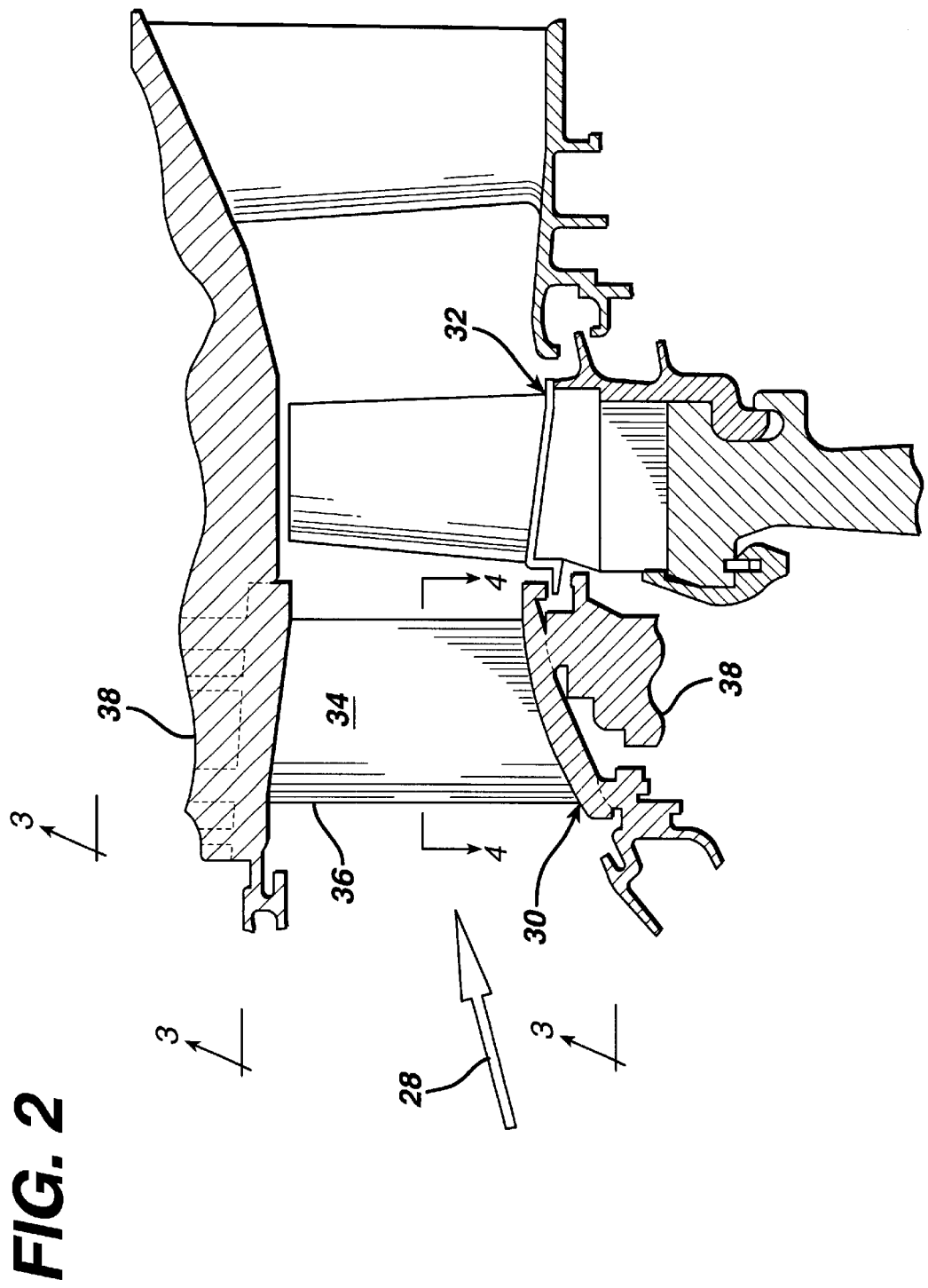
FIG. 2 is an enlarged cross-sectional view of a portion of a turbine illustrating a turbine vane air cooled airfoil assembly in FIG. 1.

FIG. 2 more particularly illustrates turbine 20 having a turbine vane 30 and a turbine blade 32. An airfoil 34 may be used for vane 30, which airfoil 34 is typically located in a portion of compressor 16, a portion of combustion or engine section 18, or a portion of turbine 20 and typically the later two because of the cooling features of the invention. Vane 30 has an outer wall 36 that is exposed to hot gas flow 28. Turbine vanes 30 may be cooled by air routed from one or more stages of compressor 16 through a casing 38 of machine 10.

Figure 3:
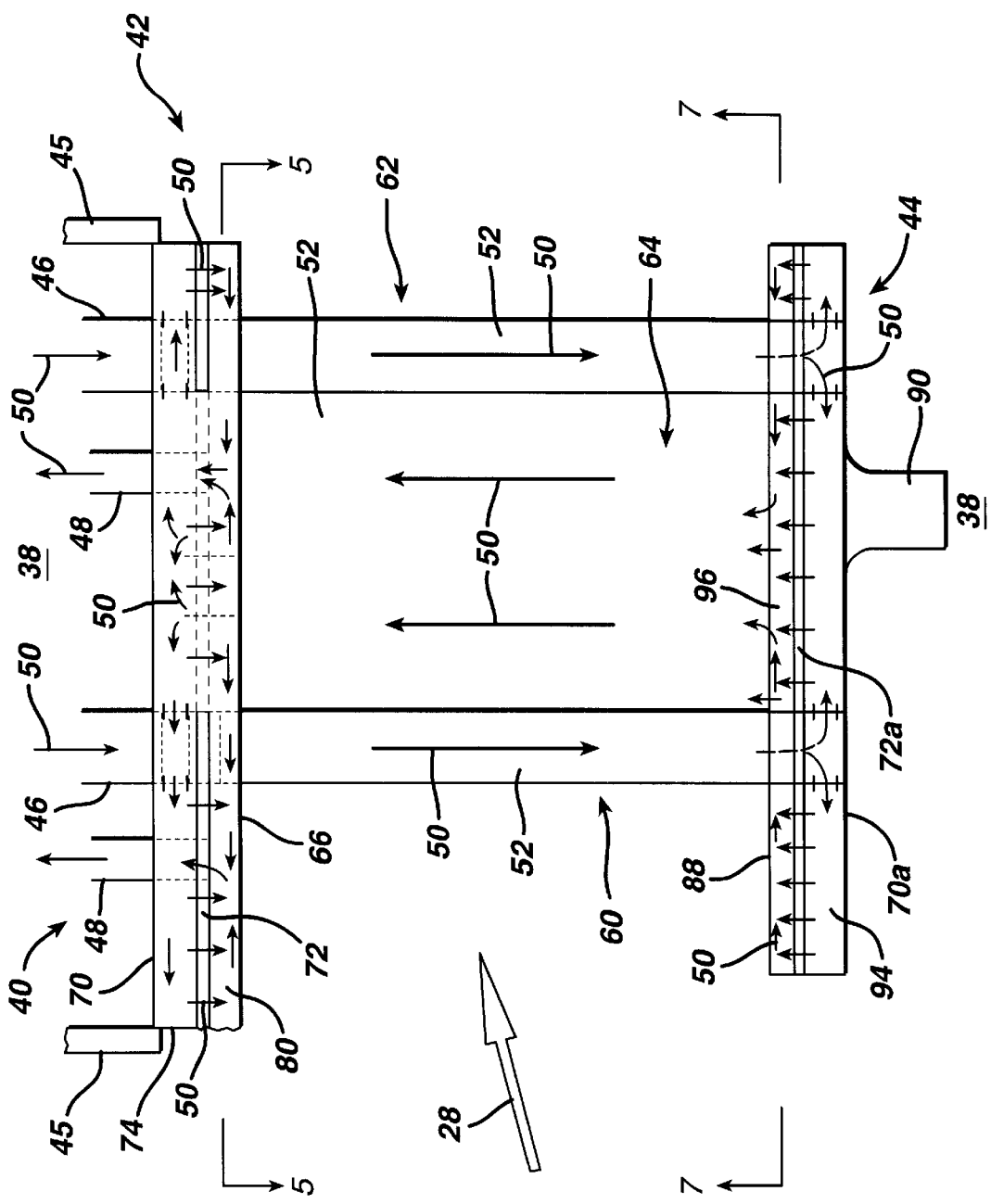
FIG. 3 is an enlarged diagrammatic cross-sectional view of the air cooled airfoil assembly taken through 3—3 in FIG. 2, where the arrows 3 represent the z-axis.

Illustrated in FIG. 3 is a coolable airfoil assembly 40 for use and exposure in hot fluid flow 28 of a portion of machine 10 (FIG. 1). Assembly 40 includes a first flange 42 configured to be connected with casing 38 of machine 10 (FIG. 1). A second flange 44 is also configured to be connected with casing 38 generally opposing first flange 42. When assembled together, flanges 42 and 44 are typically connected with casing 38 by structural interconnection, for example, by struts 45, as will be understood by those skilled in the art. A cooling conduit (not shown) extends through machine 10 (FIG. 1), or is in communication with machine 10, by conventional means. The cooling conduit typically communicates with, for example, first flange 42, through casing 38 to bring a coolant fluid (e.g., air from a conventional off-board source, steam from bottoming cycle of steam processing system, compressor air from earlier stage of machine 10, or the like) via inlets 46 and via outlets 48, to and from respectively, airfoil assembly 40. A closed flow path, generally represented by flow arrows 50, is formed from casing 38 through first flange 42, second flange 44 and at least one channel 52 in which coolant fluid passes to cool airfoil assembly 40. Airfoil 34 is connected with and between first flange 42 and second flange 44, typically formed or cast integrally. Alternatively, any number of such parts may be formed integrally or separately, or with any desired features or configurations. For instance, flanges 42 and 44 and airfoil 34 may be formed separately, and then connected together such as by welding or brazing. Additionally, different parts of assembly 40 may be formed with different (e.g., compatible) materials.

Figure 4:
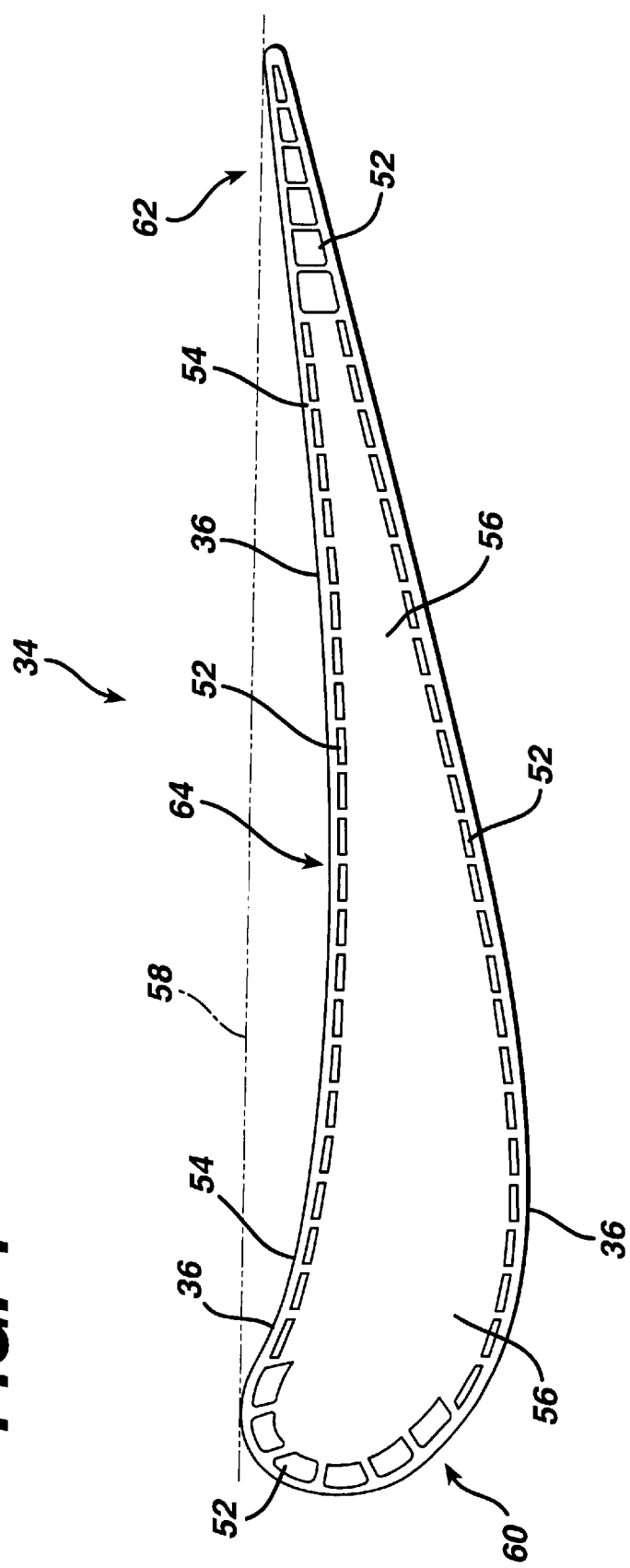
FIG. 4 is an enlarged cross-sectional view of the air cooled airfoil taken through 4—4 in FIG. 2.

FIG. 4 illustrates airfoil 34 having a solid medial configuration. Airfoil 34 includes a peripheral portion 54 surrounding a medial portion 56. Airfoil 34 typically includes a generally chordwise 58 extending leading edge section 60 joined with a trailing edge section 62 by a midchord section 64 adjoining each therebetween. At least one channel 52 is disposed in peripheral portion 54 extending between first flange 42 and second flange 44 and is in flow communication with each. In one example, channel 52 includes a plurality of channels 52, e.g., straight through convection channels, flow connected with the flow path. Airfoil 34 with channels 52 is formed, for example, by employing a technique such as investment casting. An exemplary investment casting process is disclosed in a document entitled "From Teeth to Jet Engines" (authored by Joseph L. Mallardi, copyrighted 1992, and available from Howmet Corporation, Corporate Relations Department, P.O. Box 1960, 475 Steamboat Road, Greenwich, Conn. 06836-1960, U.S.A.).

Referring to FIGS. 3 and 4, in one embodiment of the invention channels 52 are each configured to attain a desired cooling range corresponding to their particular peripheral portion 54 location. For example, leading and trailing edge sections 60 and 62 tend to have a higher local heat load since they have less surface area over which to spread the heat load from hot fluid flow 28. Thus, at least one of channels 52 disposed in leading edge and trailing edge sections 60 and 62 may have a cross-sectional flow area greater than a cross-sectional flow area of channels 52 in midchord section 64 in order to more rapidly or sufficiently cool leading and trailing edge section 60, 62. The configuration of channels 52 will typically vary depending on the heat load relief desired at a particular location. Furthermore, the flow path may be configured to direct coolant fluid from inlets 46 to leading edge section 60 channels or trailing edge section 62 channels and then to midchord section 64 channels and outlets 48.

In another embodiment, channels 52 are configured to enable a high velocity flow of coolant fluid to flow therethrough. Utilizing the high velocity flow, a compressible coolant fluid flowing at a rate in the range between about 50 meters per second to about 250 meters per second and typically greater than 100 meters per second, enables more effective cooling of the airfoil assembly. Alternatively, a conventional incompressible coolant fluid flowing at a rate less than about 100 meters per second could also be employed. Channels 52 may be configured to reduce a pressure stress or ballooning, exerted by the coolant fluid onto inner walls of channels 52 by utilizing the geometric configurations illustrated in the exemplary embodiments. Channels 52 may have a length greater than a width to compensate for the pressure forces exerted by the coolant fluid on the inner walls of channels 52, as seen in midchord section 64. Alternatively, channels 52 may have a volume, represented by cross-sectional flow area, to compensate for the pressure forces exerted by the coolant fluid on the inner walls of channels 52, as seen in leading and trailing sections 60 and 62.

Figure 5:
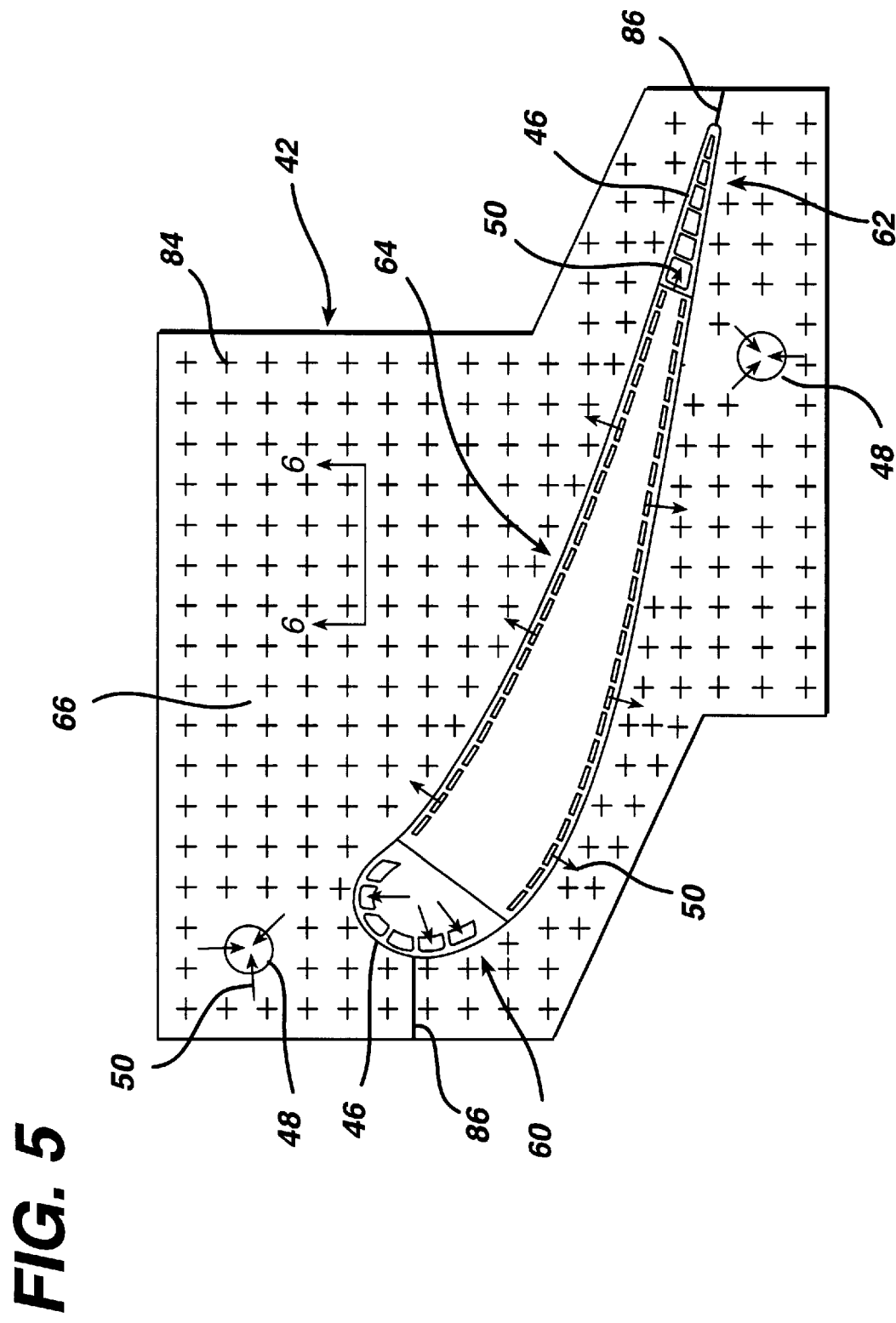
FIG. 5 is a cross-sectional diagrammatic view of a first flange of the air cooled airfoil assembly taken through 5—5 in FIG. 3.

FIG. 5 illustrates a cross-sectional view of an outer wall 66 of first flange 42 along line 5—5 of FIG. 3. First flange 42 includes inlets 46 and outlets 48 in flow communication with the flow path. The flow path of coolant fluid through inlets 46 would be normal to and radially "in" to flange 42, with the flow path directly communicating coolant fluid to the leading and trailing edge sections 60 and 62. The flow path of coolant fluid through outlets 48 and from midchord section 64 channels would be normal to but radially "out" of flange 42, with the flow path directly communicating coolant fluid from outer wall 66 to outlets 48 without intersecting the flow of fluid from inlets 46 to leading and trailing edge sections 60 and 62.

Figure 6:
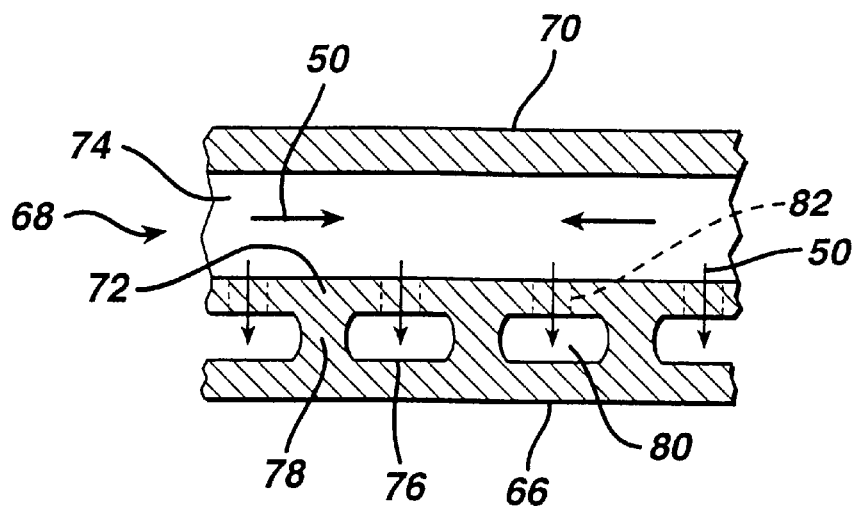
FIG. 6 is a cross-sectional diagrammatic view of a portion of the first flange taken through 6—6 in FIG. 5.

Also referring to FIGS. 6 and 3, first flange 42 may include a plenum 68 in flow communication with the flow path. Plenum 68 may include a plenum cover plate 70 spaced from an inner wall 72 and forming a chamber 74 therebetween for distributing the coolant fluid therein. Plenum 68 may also include impingement channels 76 including pins 78 to space inner wall 72 from outer wall 66 and form a second chamber 80. Further, jets 82, for example holes, may be formed in inner wall 72 to communicate the coolant fluid from chamber 74 to second chamber 80 and impinge upon outer wall 66 thereby aiding in cooling outer wall 66. First chamber 74 is in direct communication with channels 52 in midchord section 64 for receiving the coolant fluid therefrom. Second chamber 80 is in direct communication with outlets 48 for communicating the coolant fluid out of second flange 44 through outlets 48. The "+" symbols 84 of FIG. 5 represent locations where a jet 82 impinges upon outer wall 66. The orientation, number and size of jets 82 could be random or calculated based on desired cooling effects. Also, a coolant fluid division member 86 could be formed to limit the flow of coolant fluid across outer wall 66 in second chamber 80 and thereby better regulate the amount of the flow of fluid leaving each outlet 48.

Figure 7:
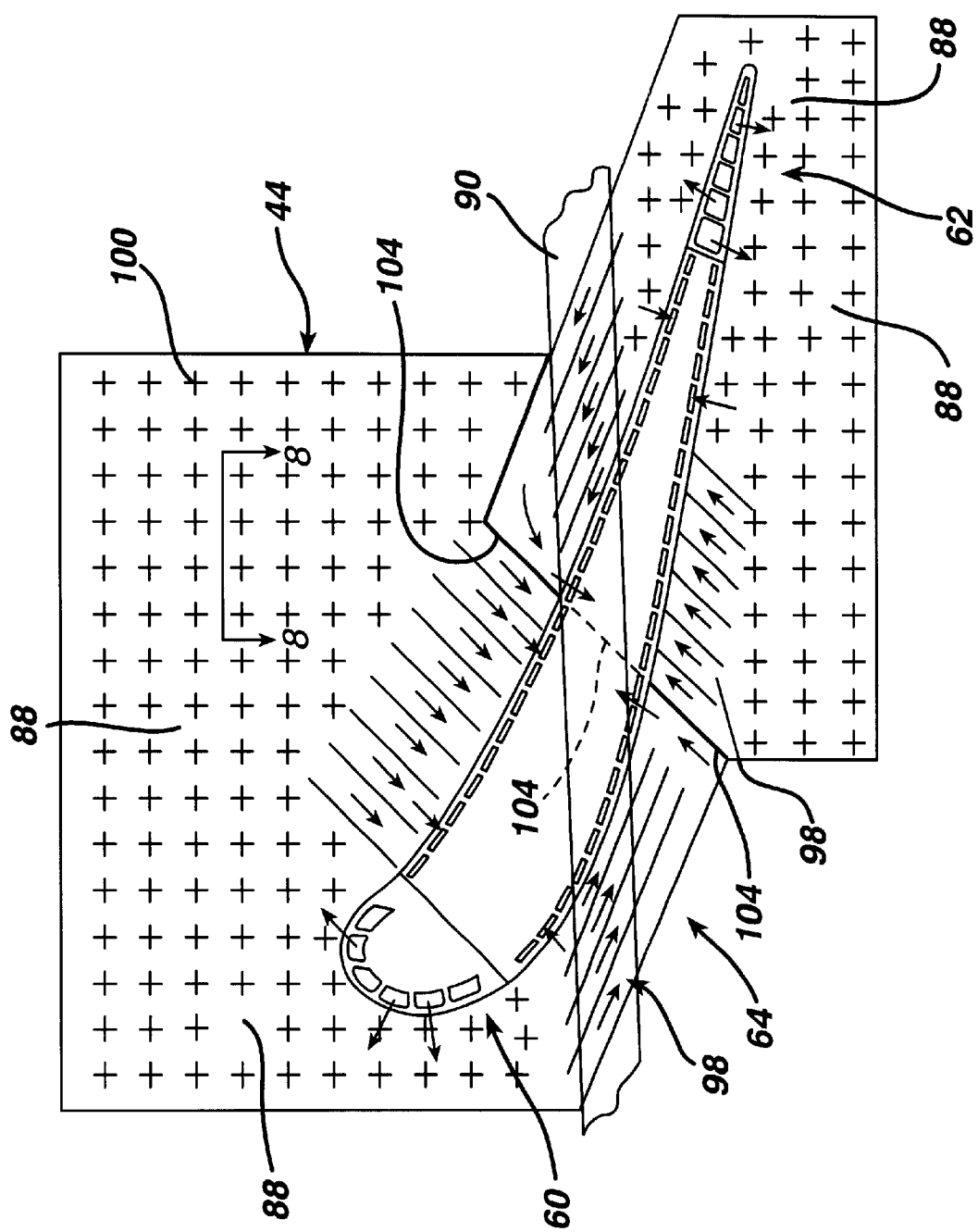
FIG. 7 is a cross-sectional diagrammatic view of a second flange of the air cooled airfoil assembly taken through 7—7 in FIG. 3.

FIG. 7 illustrates a cross-sectional view of an outer wall 88 of second flange 44 along line 7—7 of FIG. 3. Second flange 44 is similar to first flange 42 but differs in particular configurations and function. For example, second flange 44 is typically connected to a support rail 90 and flange 44 may also have connections (not shown) to casing 38 similar to struts 45 (FIG. 3). Further, the flow path of coolant fluid from leading and trailing edge sections 60 and 62 would be normal to and radially "out" of flange 44, with the flow path communicating coolant fluid through second flange 44 as hereinafter described. The flow path of coolant fluid from second flange 44 into midchord section 64 would be normal to and radially "in" to flange 44, with the flow path directly communicating coolant fluid from outer wall 88 into midchord section 64 channels without intersecting the flow of fluid coming from leading and trailing edge sections 60 and 62.

Figure 8:
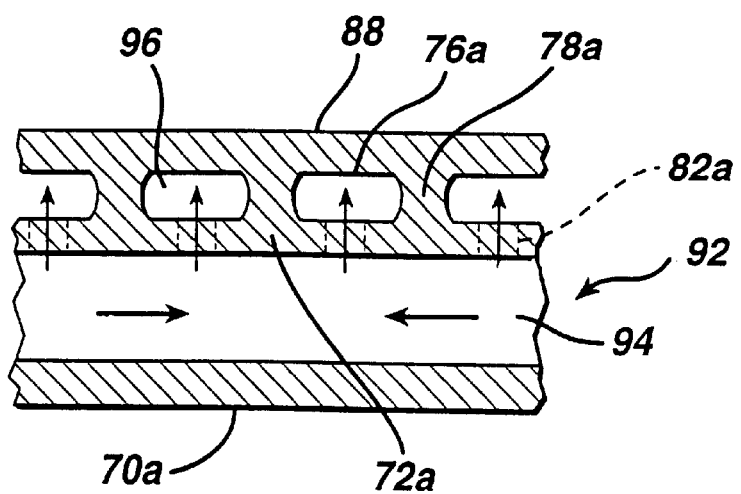
FIG. 8 is a cross-sectional diagrammatic view of a portion of the second flange taken through 8—8 in FIG. 7.

Also referring to FIGS. 8 and 3, second flange 44 may include a second plenum 92 in flow communication with the flow path for receiving and distributing the coolant fluid. Second plenum 92 functions similar to first flange 42 and is similarly numbered with an "a" following the number except where differences exist. For example, a first chamber 94 is in direct communication with channels 52 in leading and trailing edge sections 60 and 62 for receiving the coolant fluid. Additionally, a second chamber 96 is in direct communication with midchord section 64 channels for communicating the coolant fluid into those channels. Either plenums 68 (FIG. 6) or 92 (FIG. 8) may include convection channels 98 (FIG. 7), as would be known by one of ordinary skill in the art, in addition or alternative to impingement channels 76, both types of channels for cooling outer walls 66 and 88 of first and second flanges 42 and 44 respectively. The "+" symbols 100 of FIG. 7 also represent jets similar to jets 84 previously described. Second flange 44 may also include coolant fluid division members 104, similar to members 86 previously described. First flange 42 and second flange 44 may be formed by conventional means such as investment casting discussed above. Alternatively, the respective flanges and corresponding plenum parts may be cast integrally or separately, and if separately the parts may be brazed or otherwise connected by conventional means.

Referring to FIGS. 3, 5 and 7, the flow path may be configured to direct coolant fluid in various directions through channels 52, for example, at least two opposing directions (for example, the flow direction through leading edge section 60 channels or trailing edge section 62 channels versus the flow direction through midchord section 64 channels) when the coolant fluid enters and leaves assembly 40 from the same side. It should be understood, however, that the coolant fluid could enter or leave assembly 40 from the same or different sides. The flow path may be configured to direct coolant fluid through channels 52 arranged in a series relationship (for example, the flow pattern from leading edge section 60 channels or trailing edge section 62 channels to the midchord section 64 channels, or the channels within each section (not shown) ), a parallel relationship (for example, the flow pattern through the plurality of channels 52 within each leading edge, trailing edge or midchord section) or a combination of series and parallel relationships (for example, the overall flow pattern illustrated as an exemplary embodiment).

Figure 9:
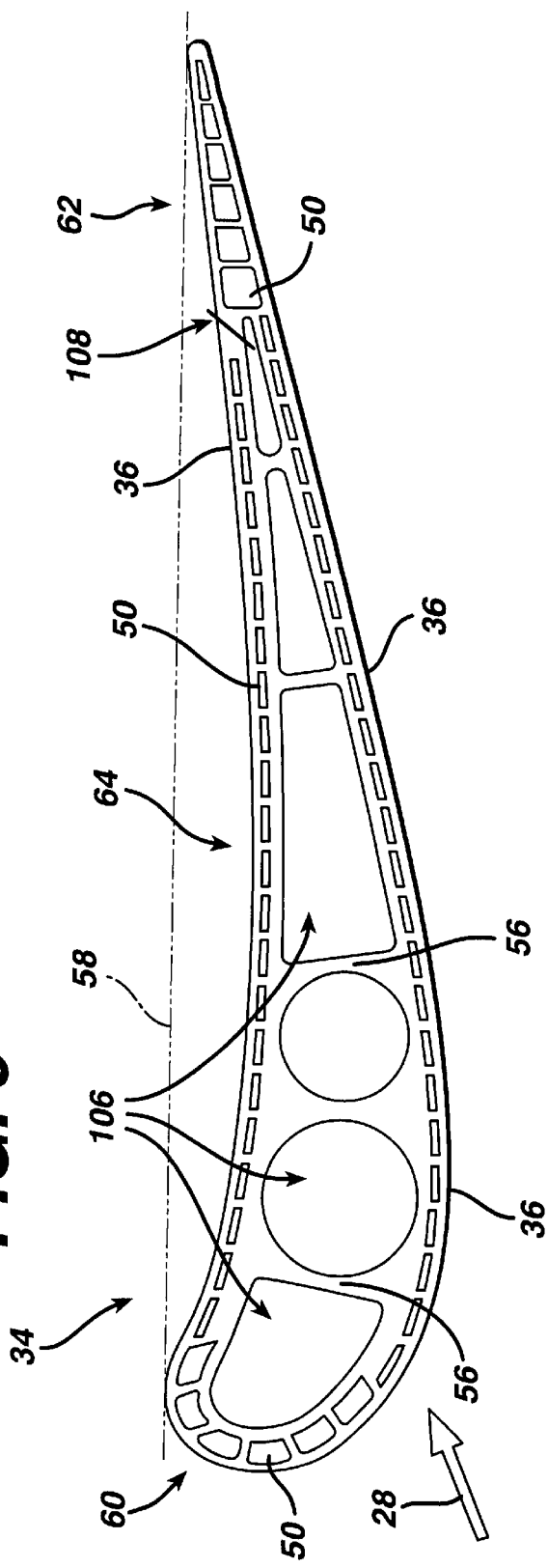
FIG. 9 is a view similar to FIG. 4, but of an alternative embodiment of an airfoil of one embodiment of the present invention.

FIG. 9 illustrates yet an alternative embodiment of the invention in which an airfoil 122 includes at least one hollow 106, for example, six straight through hollows 106 in medial portion 56. For example, hollow 106 can be configured to receive a second coolant fluid, as would be known by one of ordinary skill in the art. Such a configuration could include air-cooling, steam-cooling, open-circuit cooling, closed-circuit cooling or film-cooling, using a coolant fluid such as compressor discharge air from machine 10 or an external source (not shown). In an open-circuit configuration, airfoil 122 may include an opening 108 isolated from the flow path and in flow communication with hollow 106 for communicating the second coolant out of hollow 106 as a film or otherwise. There may also be other openings (not shown) that flow connect one or more hollow 106 or vent the second coolant fluid from airfoil 34 into a portion of machine 10 out of airfoil 34 and in communication with fluid flow 28 or in a closed-circuit coolant fluid path (not shown) similar to that for the first coolant fluid.

In another embodiment, the invention includes a process for closed-circuit cooling of airfoil assembly 40. The process may first include locating airfoil 34 in a portion of machine 10 between first flange 42 and second flange 44, as discussed above. Next, airfoil 34 is exposed to hot fluid flow 28 in machine 10. The flow of coolant fluid can then be circulated through the closed flow path from the conduit (not shown) and enters airfoil assembly 34 through inlets 46 on first flange 42, flows radially inward through leading edge section 60 channels and trailing edge section 62 channels, flows through second flange 44 and plenum 92, flows radially outward through midchord section 64 channels, flows through first flange 42 and plenum 68 toward and then through outlets 48. In regards to sufficiently cooling particular locations of airfoil 34, for example, the flow of coolant fluid may be separated in substantially equal portions such that about a 50/50 split of the flow enters each inlet 46.

Figure 10:
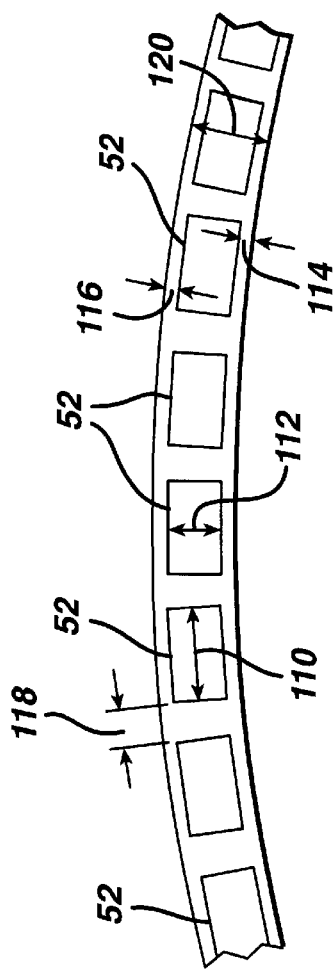
FIG. 10 is an enlarged cross-sectional view of a peripheral portion of the airfoil in FIG. 8.

Utilizing one or more of the configurations disclosed herein, it is further possible that the effects of thermal stress due to exposure of outer walls 36, 66 and 88 of airfoil 34, first flange 42 and second flange 44, respectively, in hot fluid flow 28 are reduced. Further, for example, although various dimensions may be possible, FIG. 10 illustrates a range of exemplary dimensions for a portion of outer wall 36 of airfoil 122 illustrated in FIG. 9. By analogy, similar dimensions may be applied to outer walls 66, 88 or 36 of first flange 42, second flange 44 and airfoil 34, respectively, illustrated in FIG. 3. In FIG. 10, channels 52 may have a length 110 in the range between about 1.5 mm to about 15 mm, a width 112 in the range between about 0.5 mm to about 5 mm, an inside thickness 114 in the range between about 0.5 mm to about 4 mm, and outside thickness 116 in the range between about 0.5 mm to about 2 mm and preferably about 2 mm, a length wall thickness 118 between channels 52 in the range between about 0.2 times length 110 to about length 110, and an overall thickness 120 in the range between about 1.5 mm to about 11 mm. Still further, although not illustrated, channels 52 and impingement surfaces, such as outer walls 66 and 88, may be smooth, rough, textured or turbulated to enhance or control the cooling effects of each, as would be known by one of ordinary skill in the art.

As various possible embodiments may be made in the above invention for use for different purposes and as various changes might be made in the embodiments above set forth, it is understood that all matters here set forth or shown in the accompanying drawings are to be interpreted as illustrative and not in a limiting sense. While only certain features of the invention have been illustrated and described, many modifications and changes will occur to those skilled in the art. It is therefore to be understood that the appended claims are intended to cover all such modifications and changes as fall within the true spirit of the invention.

What is claimed is:

1. A closed-circuit coolable airfoil assembly for use and exposure in a hot fluid flow of a machine portion, comprising:

a first flange configured to be connected with a casing of said machine portion;

a second flange configured to be connected with said casing;

an airfoil connected with and between said first flange and said second flange, said airfoil including a peripheral portion surrounding a medial portion;

at least one channel disposed in said peripheral portion, said channel extending between said first flange and said second flange and being in flow communication with each; and a closed flow path formed from said casing and through said first flange, said second flange and said channel; wherein said airfoil includes a chordwise extending leading edge section joined with a trailing edge section by a midchord section adjoining each therebetween and said at least one channel includes a plurality of channels connected with said flow path and said first flange includes an inlet and an outlet in flow communication with said flow path and said flow path is configured to direct coolant fluid from said inlet to said leading edge or trailing edge channels and then to said midchord channels and said outlet.

2. The airfoil assembly of claim 1, wherein said airfoil includes a chordwise extending leading edge section joined with a trailing edge section by a midchord section adjoining each therebetween and said at least one channel includes a plurality of channels flow connected with said flow path.

3. The airfoil assembly of claim 2, in which at least one of said channels disposed in said leading edge and trailing edge sections has a cross-sectional flow area greater than a cross-sectional flow area of at least one of said channels in said midchord section.

4. The airfoil assembly of claim 2, in which said flow path is configured to direct coolant fluid in at least two opposing directions through said channels.

5. The airfoil assembly of claim 2, in which said plurality of channels are arranged in a manner selected from the group consisting of a series relationship, a parallel relationship and a combination of series and parallel relationships.

6. The airfoil assembly of claim 2, in which said first flange includes an inlet and an outlet in flow communication with said flow path and said flow path is configured to direct coolant fluid from said inlet to at least one of said leading edge and said trailing edge channels and then to said midchord channels and said outlet.

7. The airfoil assembly of claim 2, in which said plurality of channels are each configured to attain a cooling capacity corresponding to a respective peripheral portion.

8. The airfoil assembly of claim 1, in which said first and said second flanges each include a plenum in flow communication with said flow path and said plenum is configured to distribute said coolant fluid therein.

9. The airfoil assembly of claim 8, in which said plenum includes convection channels or impingement channels configured to cool an outer wall of said first or second flanges.

10. The airfoil assembly of claim 1, in which said airfoil includes at least one hollow in said medial portion.

11. The airfoil assembly of claim 10, in which said hollow is configured to receive a second coolant fluid and in which said airfoil includes an opening isolated from said flow path and in flow communication with said hollow for communicating said second coolant fluid out of said hollow.

12. The airfoil assembly of claim 1, in which at least one of said first flange and said second flange is connected with said casing and said machine portion comprises at least one of a turbine portion, an engine portion, and a compressor portion.

13. The airfoil assembly of claim 1, in which said channel is configured to reduce a pressure stress exerted by said coolant fluid onto walls of said channel.

14. The airfoil assembly of claim 1, in which at least one of said airfoil, said first flange and said second flange have an outer wall configured to reduce a thermal stress thereof.

15. A process for closed-circuit cooling of an airfoil assembly, comprising:

locating an airfoil in a machine portion between a first flange and a second flange, said airfoil including a peripheral portion surrounding a medial portion;

exposing said airfoil to a hot fluid flow in said machine portion;

circulating a flow of coolant fluid through a closed flow path, said flow path including said first and second flanges and at least one channel disposed in said peripheral portion of said airfoil and in flow communication with said first and second flanges;

wherein said airfoil includes a chordwise extending leading edge section joined with a trailing edge section by a midchord section adjoining each therebetween and said at least one channel includes a plurality of channels connected with said flow path and said said flow path and said flow path is configured to direct coolant fluid from said inlet to said leading edge or trailing edge channels and then to said midchord channels and said outlet.

16. The process of claim 15, further comprising passing said coolant fluid through said first flange and in which coolant fluid then circulates through said channel, through said second flange and then through said first flange.

17. The process of claim 15, in which said circulating includes passing substantially equal portions of said flow of coolant fluid through a pair of inlets in flow communication with said flow path.

18. The process of claim 17, in which said pair of inlets are located at a greater radial distance than a radial distance of said airfoil and said flow of coolant fluid first flows from said inlets radially inward.

19. A closed-circuit coolable airfoil assembly for use and exposure in a hot fluid flow of a machine portion, comprising:

a first flange configured to be connected with a casing of said machine portion;

a second flange configured to be connected with said casing;

an airfoil connected with and between said first flange and said second flange, said airfoil including a peripheral portion surrounding a medial portion;

at least one channel disposed in said peripheral portion, said channel extending between said first flange and said second flange and being in flow communication with each;

a closed flow path formed from said casing and through said first flange, said second flange and said channel;

wherein said airfoil includes at least one hollow in said medial portion; and said hollow is configured to receive a second coolant fluid and in which said airfoil includes an opening isolated from said flow path and in flow communication with said hollow for communicating said second coolant fluid out of said hollow.

* * * * *